March 30, 1948.    W. C. HUGULEY    2,438,701
ADJUSTABLE-ELECTRODE ARC WELDING TORCH
Filed May 2, 1944    3 Sheets-Sheet 1
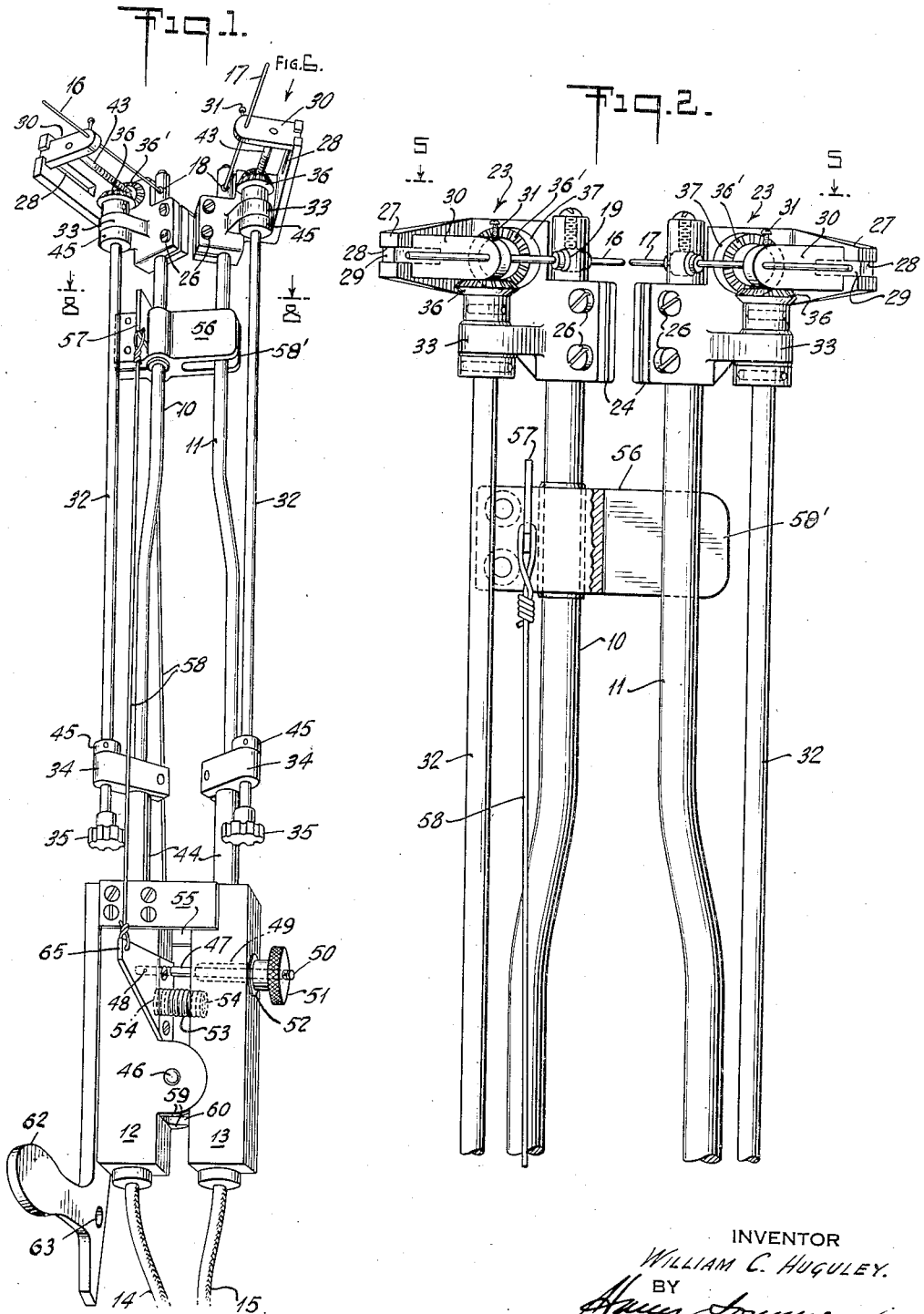
INVENTOR
WILLIAM C. HUGULEY.
BY
ATTORNEY March 30, 1948. W. C. HUGULEY 2,438,701
ADJUSTABLE-ELECTRODE ARC WELDING TORCH
Filed May 2, 1944 3 Sheets-Sheet 2
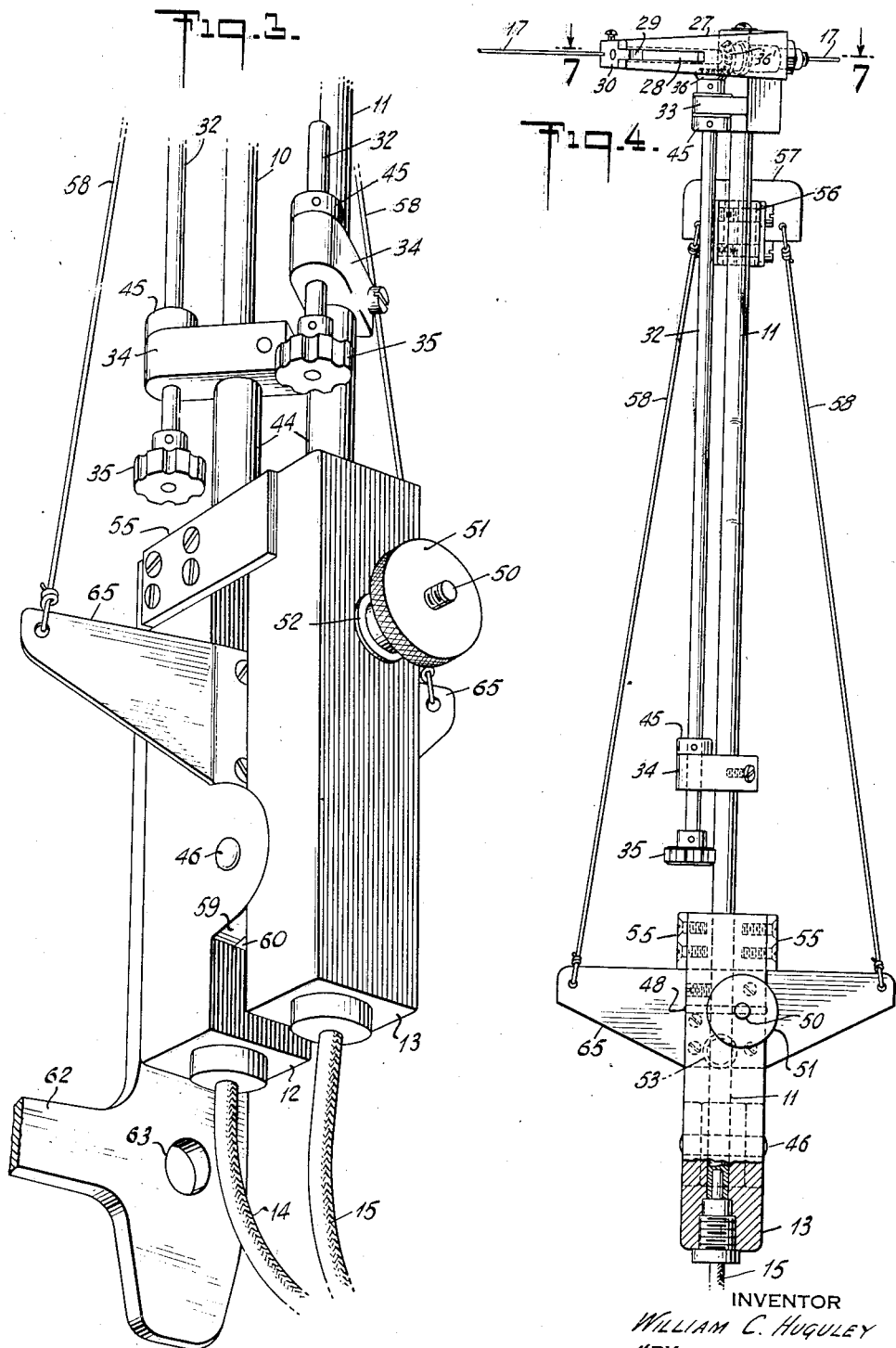
INVENTOR
WILLIAM C. HUGULEY
BY
ATTORNEY

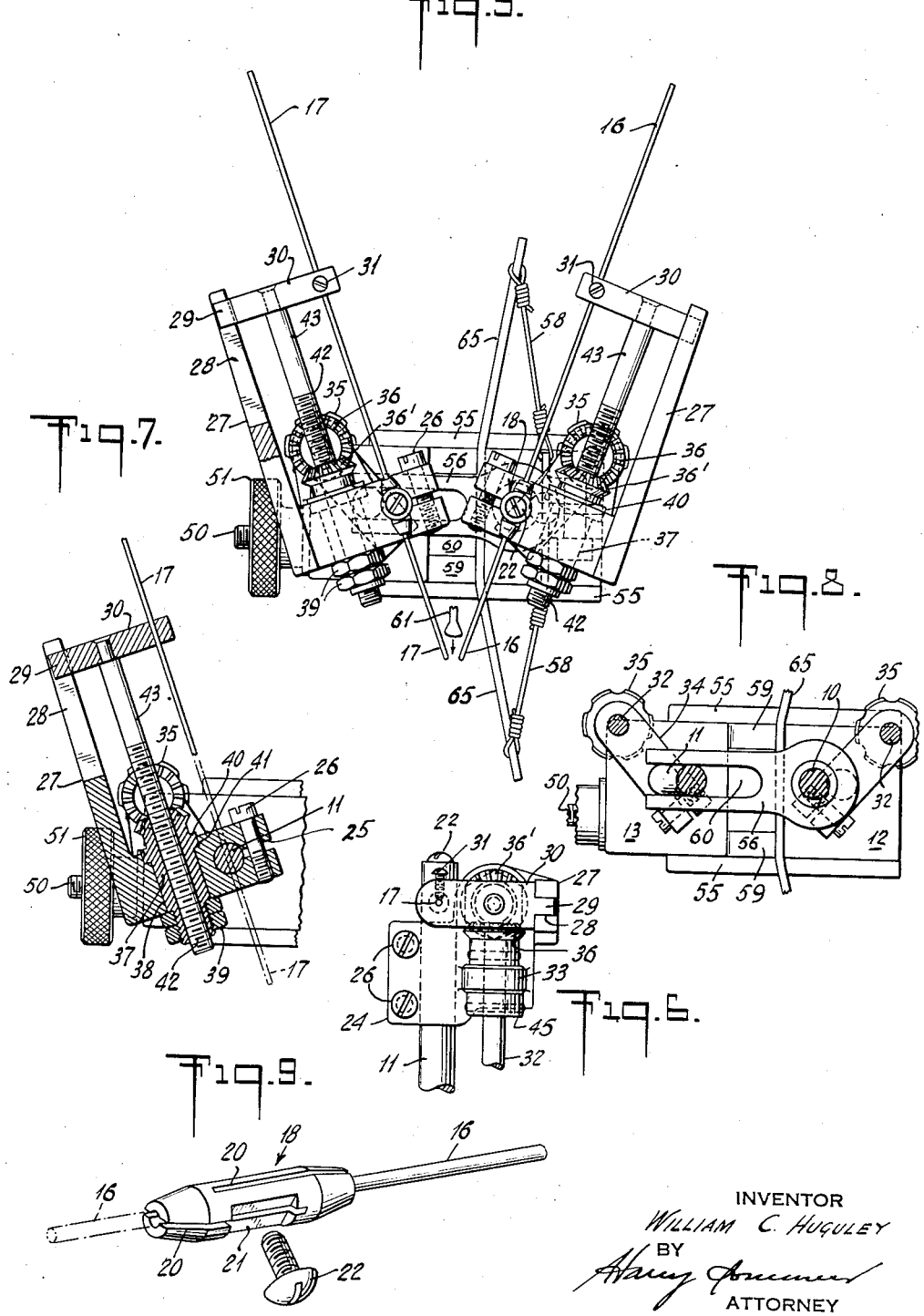

Patented Mar. 30, 1948

2,438,701

UNITED STATES PATENT OFFICE 2,438,701

ADJUSTABLE-ELECTRODE ARC WELDING TORCH

William C. Huguley, Belleville, N. J.

Application May 2, 1944, Serial No. 533,774

8 Claims. (Cl. 219—14)

This invention relates to improvements in arc welding apparatus wherein an arc is electrically maintained between the ends of electrodes which are positioned so as to present therebetween a predetermined arc gap.

It has been found, in practice, that in systems wherein the heat of the arc is intense, the ends of the electrodes which define the arc vaporize in use, so that periodically the arc is broken, interrupting the operation of the apparatus and necessitating the resetting of the electrodes.

This difficulty has been encountered particularly in atomic hydrogen arc welding apparatus wherein a stream of hydrogen is passed over the electric arc. The heat of the arc apparently causes a reaction in which the hydrogen changes from molecular to atomic form and then reverts to molecular form; in so doing, intense heat is liberated or generated. Hydrogen arc welding systems are very desirable for the reason that the intense heat which is attained thereby is higher than that of other present commercial systems, and, as the electric arc is maintained between two electrodes, the apparatus does not depend upon the work to serve as an electrode to complete the arc. There are many other commercial and practical advantages inherent in the use of atomic hydrogen arc welding apparatus. These advantages are well known to those skilled in the art to which this invention pertains.

However, due to the intense heat of the arc, the system has the disadvantage noted above, namely, the tendency of the electrode ends to vaporize in use. Furthermore, intense heat at the arc end of the apparatus makes it extremely difficult and awkward to reset the electrodes. It is the object of my invention to compensate for the vaporization of the electrode ends in use, by providing means which may be actuated from a point of safety, remote from the electrodes, whereby the latter may be advanced in use to maintain the required arc gap and compensate for vaporization. This object is attained without interrupting the continuous operation of the apparatus and without permitting the arc to be broken, so that the use of my invention assures the continuous, efficient and safe operation of the apparatus.

A further object of the invention is to provide an apparatus of the character described wherein the electrodes are maintained at a plane substantially at right angles to the longitudinal axis of the apparatus and remote from the handle of the apparatus, for facility and safety in manipulating and using the apparatus.

These and other advantageous objects, which will later appear, are accomplished by the simple and practical construction and arrangements of parts hereinafter described, and exhibited in the accompanying drawings, forming part hereof, and in which:

Fig. 1 is a perspective view of the apparatus of my invention,

Fig. 2 is a side elevational view, partly fragmentary, of the upper portion of the apparatus shown in Fig. 1, Fig. 3 is a perspective view, partly fragmentary, of the lower portion of the apparatus shown in Fig. 1, Fig. 4 is an end elevational view of the apparatus, Fig. 5 is a top plan view thereof taken on lines 5—5 of Fig. 2, Fig. 6 is a fragmentary elevational view taken at position designated "Fig. 6" of Fig. 1, Fig. 7 is a horizontal sectional view taken on line 7—7 of Fig. 4, in the direction of the arrows, Fig. 8 is a transverse sectional view taken on line 8—8 of Fig. 1, in the direction of the arrows, and Fig. 9 is an enlarged, exploded view of parts of the apparatus more particularly described hereinafter.

In the drawings, the apparatus of my invention is shown to comprise a pair of current conductors 10 and 11, the lower ends of which are preferably positioned in and protrude from the portions 12 and 13 of the handle of the apparatus, said conductors 10 and 11 being electrically connected within the handle portions to current carrying cables 14 and 15 in any desired or convenient manner, for example, as shown in Fig. 4, by providing a friction contact therebetween. The upper ends of the conductors 10 and 11 are electrically connected to the electrodes 16 and 17, and said electrodes are adjustably positioned in the apparatus, by means hereinafter described.

In the apparatus of my invention many corresponding parts are associated with electrodes 16 and 17. For the sake of a more facile understanding of the invention, such parts have been given corresponding reference characters in the drawings. All parts correspondingly numbered shall be deemed to be referred to in the description of one part bearing the common reference character.

One end of the electrode 17 has sliding frictional contact with the interior of spring collet 18 positioned in an aperture 19 in the upper end of the conductor 11, said resilient member 18 (see Fig. 9) being provided with longitudinal slits 20 and having a flattened portion 21 against which the adjusting screw 22 is adapted to bear at right angles to the longitudinal plane of said spring collet, to hold the same in the conductor 11. The electrode 17 passes through said spring collet 19 and is thereby automatically aligned with the correspondingly protruding end of the other electrode 16 so that said electrode ends, by the means described are automatically maintained in accurately aligned position to describe an arc defining V (see Fig. 5). The electrodes are preferably made of tungsten or similar material.

When, due to the intense heat of the arc, the electrode ends vaporize so that the gap is widened to a point where the arc is in danger of being broken or is actually broken, it is merely necessary, in the use of my apparatus, to advance the electrodes 16 and 17 through their spring collets and toward each other to compensate for the condition mentioned. In the use of atomic hydrogen arc welding structures the adjustments commonly required to compensate for vaporization of the electrode ends have been not only complicated, necessitating the use of tools and involving the expenditure of considerable skill, time and patience, but there has also been entailed the danger of injury due to the intense heat at the arc area, where such adjustments have been commonly made. I have provided an apparatus wherein this adjustment may be effected without interrupting the use of the apparatus and without in any manner endangering the operator or subjecting him to inconvenience. The adjustment is made in a simple, accurate manner, without the use of tools, as will be presently described.

A bracket member 23 is fixed to the conductor 11 by any suitable or convenient means, such as for example, by providing the bracket with a split jaw 24, the opening 25 of which is adapted to receive the conductor 11, said jaw 24 being provided with bolt or similar means 26 for clamping the bracket rigidly to the conductor 11. The bracket is provided with an angularly directed base 27 having a longitudinal slit 28 for the reception of the shouldered tongue 29 of a plate 30 in which the electrode 17 is rigidly fixed in any desired or convenient manner, as for example by passing said electrode through an aperture in said plate and fixing and locking the electrode therein by a set screw 31 threaded through the plate 30 and locking the electrode 17 therein (see Figs. 1 and 2). I have provided means whereby the plate 30 may be reciprocated on the bracket 23 to reciprocate the electrode 17 through the friction spring collet 19. In the preferred form of my invention, the reciprocation of the electrode 17 referred to is obtained by rotatably positioning a shaft 32 in spaced bearings 33 and 34, said bearings being secured to or integral with the bracket 23 and conductor 11 respectively, said bearings being so arranged as to vertically position the shaft 32 at right angles to the axis of the electrode 17, the free end of said shaft being located remote from the electrode 17 and being adapted to be rotated by knob 35 or the like. Fixed to the upper end of said shaft 32 is a gear 36 which is horizontally positioned on the bearing 33 and meshes with the gear 36' which is fixed to or made integral with the sleeve 37 rotatably disposed in an aperture 38 in the bracket 23 (see Fig. 7). The sleeve 37 is held against displacement in said aperture 38 by lock nuts 39 threaded to one end of said sleeve and bearing against one face of the bracket and by a shouldered portion 40 integral with or secured to said sleeve at the other end thereof adjacent the bevel gear 36' and adapted to be rotated in a shouldered recess 41 in the bracket. The gear 36' and its sleeve 37 are internally threaded for threaded engagement with the threaded end 42 of a pin 43, the other end of said pin being rigidly fixed to the plate 30.

It will be apparent from this description that on the rotation of the shaft 32, gears 36 and 36' will mesh, drawing the pin 43 through the internally threaded gear 36' and sleeve 37, to reciprocate the electrode 17 in the spring collet 18. By this arrangement, in the use of the apparatus, the electrode ends may be periodically advanced toward each other to compensate for the vaporization thereof in use and without necessitating any interruption in the use of the apparatus. It will also be apparent that as the knobs 35 are located adjacent the handle portions 12 and 13 and remote from the electrode 17 the structure provides a maximum of convenience and safety in obtaining this adjustment. It will be apparent that such expedients as, for example, the provision of insulating bushings 44 around the conductor 11 and the provision of washers 45 on the shaft 32, and the means for journalling the shaft 32 in the apparatus, the use in the invention of dielectric materials where appropriate and similar expedients and modifications within the purview of the appended claims shall be deemed to be within the scope of this invention.

To strike an arc with the apparatus of my invention the electrode ends are initially brought together; they are then separated to present therebetween the desired arc gap. In order to provide for the convenient initial striking of the arc as just described, the handle members 12 and 13 are provided with complementary means to pivot the same together at 46 and a pin 47 fixed at one end, 48, to the handle element 12, the other end of said pin passing through an aperture 49 in the handle element 13, said aperture being of substantially greater cross section than the cross section of the pin, the pin protruding through said aperture with the protruding end 50 of the pin externally threaded for threaded engagement by the internally threaded knob 51 or the like, a washer 52 being preferably interposed between said knob 51 and the handle element 13. By the arrangement described, it is merely necessary to rotate the knob 51 to pivot the handle elements 12 and 13 together above the pivot point and thereby cause the electrode ends to be brought together to strike the arc; by simply turning the knob 51 in a reverse direction said handle elements will be returned to their parallel spaced position, the electrodes being similarly returned to their spaced apart position. This action is preferably facilitated by the spring 53 interposed between the handle elements, the ends of said spring being received in and bearing against recessed portions 54 in the said handle elements.

If desired, means may be provided to assure stability of the electrodes and related parts depending from the handle, said means being secured to one of the handle elements or the parts carried thereby and adapted to receive the other handle elements or parts carried thereby. For example, the handle element 12 may be provided with guide bars 55 rigidly fixed to said handle element and adapted to slidably embrace and slidably receive the other handle element 13 (see Fig. 5) and a winged, forked element 56 (see Fig. 1) may be fixed to the conductor 10 intermediate the handle and electrode 16, the wing portions 57 of said member 56 depending therefrom at right angles to the longitudinal axis of the conductors, said winged members 57 being connected to the handle element 12 by any suitable or convenient means, for example by guy wires 58 fixed at opposite ends to said wings and to said handle element or to a member 65 (see Fig. 3) fixed to said handle element. The forked portion 58' of member 56 is adapted to slidably receive the conductor 11. Stability of the structure is thereby attained in all horizontal planes.

If desired, the handle elements may be provided with interfitting portions to define the means for pivoting the same together, which interfitting portions may conveniently (as shown in Fig. 1) be a pair of spaced bosses 59 fixed to one of the handle elements 12 and freely receiving a complementary boss 60 fixed to the other handle element 13 and registrably received between the bosses 59. Pivot pin 46 passes through all of said elements 59 and 60.

The apparatus described is adapted for use in a welding system in which the arc is maintained in a gaseous atmosphere. For this purpose, the apparatus may be provided with a gas tube of any convenient or desired configuration connected to a source of supply (not shown), the gas tube nozzle 61 (Fig. 5) being arranged to discharge a stream of gas at the arc gap area described by the electrode ends, or the electrode ends may be enveloped in a gaseous atmosphere provided in any other convenient manner. It will be understood that wherever reference is made to "hydrogen" gas, this is merely for the purpose of illustration, the invention being equally applicable to the use of the apparatus with other gases and in an atmosphere other than one of hydrogen.

It will be apparent that the apparatus of my invention lends itself to easy manipulation in use and may be conveniently manipulated by the operator as conditions require. The electrodes 16 and 17 are disposed at right angles to the length of the apparatus, further contributing to balance and ease of operation. If it is desired to operate the apparatus about a relatively fixed pivot, the same may be provided with an arm member 62 (Fig. 1) fixed to one of the handle elements by any suitable or convenient means, and the arm 62 may be provided with an aperture 63 for reception of a pivot pin or the like (not shown) whereby the apparatus may be positioned on and pivoted around said pivot pin.

In the drawings and in the foregoing description, the electrodes 16 and 17 are shown and described as positioned in the apparatus at a plane at right angles to the length of the apparatus. If desired, the plane of said electrodes relative to the length of the apparatus may be an acute or obtuse angle, or may parallel the conductors within the scope of the invention, where it is found, for example, that their arrangement at an angle other than a 90° angle would be more suitable for the use to which the apparatus is to be put. By positioning the brackets 23 and the collets 18 at points other than those shown in the drawings and correspondingly changing the position and arrangement of the means for reciprocating the plate 30 on the bracket 23, the electrodes may be positioned in the precise position in the apparatus suitable in the arrangement desired.

Having thus described my invention, what I claim as new and desire to secure by Letters Patent, is:

1. In an arc welding apparatus, a pair of conductors, handle members, means to secure said conductors to said handle members, means to slidably position electrodes in said conductors remote from said handle members, brackets fixed to said conductors, means to secure said electrodes to said brackets, and means carried by said conductors and adapted to engage the electrode securing means of said brackets to reciprocate the electrodes in said conductors.

2. In an arc welding apparatus, a pair of conductors, handle members, means to secure said conductors to said handle members, means to slidably position electrodes in said conductors remote from said handle members, brackets fixed to said conductors, plates slidably arranged on said brackets, means to secure said electrodes to said plates, and means carried by said conductors and adapted to engage said plates to reciprocate the latter on the brackets, and thereby reciprocate the electrodes in said conductors.

3. In an arc welding apparatus, a conductor, a handle member, means to secure said conductor to said handle member, means to slidably secure an electrode to said conductor remote from said handle member, a bracket fixed to said conductor, a shaft journalled in said bracket means, said shaft having one end disposed adjacent the handle member for manual rotation, means to secure said electrode to said bracket and complementary means on said shaft and bracket adapted, on rotation of said shaft, to reciprocate the means to secure the electrode to the bracket to thereby reciprocate the electrode in said conductor.

4. In an arc welding apparatus, a pair of conductors fixed at one end to said apparatus and depending therefrom, said conductors being provided with apertures adjacent the free ends thereof, bracket members fixed to said conductors, sleeves rotatably journalled in said bracket members, means carried by said apparatus engaging said sleeves to rotate the latter, plates slidably positioned on said brackets, means carried by said plates and engaging said sleeves to reciprocate said plates relative to said sleeves on the rotation of the latter, the apertures of said conductors adapted to slidably receive electrodes, and means to fix said electrodes to said plates whereby, on rotation of said sleeves, said electrodes will be reciprocated in said apertures to protrude therebeyond toward each other to define a predetermined arc gap.

5. In an arc welding apparatus, a conductor fixed at one end to said apparatus, said conductor being provided with an aperture, a bracket member fixed to said conductor, a sleeve rotatably journalled in said bracket member, means carried by said apparatus engaging said sleeve to rotate the latter, a plate slidably arranged on said bracket, means carried by said plate and engaging said sleeve to reciprocate said plate relative to said sleeve on the rotation of the latter, the aperture of said conductor being adapted to slidably receive one end of an electrode, and means on said plate to secure the other end of the electrode thereto, whereby, on rotation of said sleeve, said electrode will be reciprocated in said aperture to protrude therethrough.

6. In an arc welding apparatus, a spring collet positioned in said apparatus to slidably receive one end of an electrode, a plate, means on said plate engaging the other end of said electrode to secure the same to the plate and means engaging said plate to reciprocate the same relative to said collet to reciprocate said electrode in said collet.

7. In an arc welding apparatus, a spring collet provided with tapered end portions, said collet being longitudinally slitted, a bracket member fixed to said apparatus adjacent the collet, said bracket member being provided with a longitudinal slit, a plate provided with a tongue slidably received in said slit, means on said plate to secure one end of said electrode thereto with the other end of said electrode passed through said spring collet and means engaging said plate to reciprocate the same relative to said collet to reciprocate the electrode in said collet.

8. In an arc welding apparatus, spring collets positioned in said apparatus in spaced relation to each other, said collets being adapted to slidably receive electrodes, bracket members fixed to said apparatus, in spaced relation to said collets, means on said brackets adapted to hold said electrodes in spaced relation to define a V, and means engaging the means on the brackets to reciprocate the electrodes toward each other to define a predetermined arc gap at the narrow end of the V defined thereby.

WILLIAM C. HUGULEY.

REFERENCES CITED

The following references are of record in the file of this patent:

UNITED STATES PATENTS

| Number | Name | Date |
|---|---|---|
| 1,750,436 | Sounitza | Mar. 11, 1930 |
| 1,811,669 | Hansen | June 23, 1931 |
| 1,869,328 | Tobey | July 26, 1932 |
| 2,061,671 | Riemenschneider | Nov. 24, 1936 |
| 2,266,239 | Nielsen | Dec. 16, 1941 |
| 2,282,031 | Catlett | May 5, 1942 |
| 2,300,203 | Campbell | Oct. 27, 1942 |
| 2,361,918 | Baird | Nov. 7, 1944 |

FOREIGN PATENTS

| Number | Country | Date |
|---|---|---|
| 791,871 | France | Oct. 7, 1935 |